(12) United States Patent
Smith et al.

(10) Patent No.: US 7,555,675 B2
(45) Date of Patent: Jun. 30, 2009

(54) METHODS, SYSTEMS AND COMPUTER PROGRAM PRODUCTS FOR PROVIDING AN INTERNET PROTOCOL BASED DEVICE HEALTH CHECK

(75) Inventors: Michael Smith, Dacula, GA (US); Samuel Zellner, Dunwoody, GA (US)

(73) Assignee: AT&T Intellectual Property, I, L.P., Wilmington, DE (US)

( * ) Notice: Subject to any disclaimer, the term of this patent is extended or adjusted under 35 U.S.C. 154(b) by 364 days.

(21) Appl. No.: 11/379,318

(22) Filed: Apr. 19, 2006

(65) Prior Publication Data

US 2007/0260927 A1 Nov. 8, 2007

(51) Int. Cl.
G06F 11/00 (2006.01)

(52) U.S. Cl. .............................. 714/25; 714/26; 714/27; 714/43

(58) Field of Classification Search .................. 714/25, 714/26, 27, 43; 725/139
See application file for complete search history.

(56) References Cited

U.S. PATENT DOCUMENTS

| | | | |
|---|---|---|---|
| 7,111,318 B2 * | 9/2006 | Vitale et al. .................. 725/107 |
| 7,194,756 B2 * | 3/2007 | Addington et al. ........... 725/116 |
| 7,320,092 B2 * | 1/2008 | Morgan et al. ................. 714/43 |
| 7,383,473 B2 * | 6/2008 | Johnson ........................ 714/43 |
| 2002/0133766 A1 * | 9/2002 | Batten et al. ................. 714/718 |
| 2002/0144187 A1 * | 10/2002 | Morgan et al. ................. 714/43 |
| 2004/0199575 A1 * | 10/2004 | Geller .......................... 709/201 |
| 2005/0028206 A1 * | 2/2005 | Cameron et al. ............... 725/46 |
| 2005/0160471 A1 * | 7/2005 | Cohen .......................... 725/116 |
| 2005/0177853 A1 * | 8/2005 | Williams et al. ............... 725/81 |
| 2005/0286686 A1 * | 12/2005 | Krstulich .................. 379/32.01 |
| 2006/0174276 A1 * | 8/2006 | Derrenberger et al. ........ 725/46 |
| 2006/0282704 A1 * | 12/2006 | Morgan et al. ................. 714/26 |
| 2007/0050836 A1 * | 3/2007 | Stanek et al. ................ 725/131 |
| 2007/0101390 A1 * | 5/2007 | Bernard et al. .............. 725/129 |
| 2007/0204309 A1 * | 8/2007 | Bernard et al. ................. 725/87 |
| 2007/0204314 A1 * | 8/2007 | Hasek et al. ................. 725/100 |
| 2008/0120677 A1 * | 5/2008 | Bernard et al. .............. 725/129 |

* cited by examiner

*Primary Examiner*—Robert Beausoliel
*Assistant Examiner*—Charles Ehne
(74) *Attorney, Agent, or Firm*—Cantor Colburn LLP

(57) ABSTRACT

Methods, systems and computer program products provide an IP based device health check. The methods include initiating a health check to be performed at a customer location. The results of the health check are received and stored as an install state. A current state that was created in response to a diagnostic test executed at the customer location is received. The install state is compared to the current state to identify differences between the install state and the current state.

21 Claims, 3 Drawing Sheets

METHODS, SYSTEMS AND COMPUTER PROGRAM PRODUCTS FOR PROVIDING AN INTERNET PROTOCOL BASED DEVICE HEALTH CHECK

BACKGROUND

The present disclosure relates generally to internet protocol (IP) based devices, and more particularly, to methods, systems, and computer program products for providing a health check for IP based devices.

Currently, when services such as cable television service and telephone service are installed at a customer location, a service provider technician is dispatched to the customer location to set up the service. Before the technician leaves the customer location, an installation health check (e.g., an installation verification test) is performed to verify that the service at the customer location is working properly. The health check may be utilized to check that the equipment at the customer location can communicate with the equipment at the service provider location. In addition, the health check may also verify that the service provided at the customer location is performing at an acceptable quality of service level.

As new services are being developed, such as IPTV, the installation health check (as well as subsequent problem detection and repair) will become more complicated. This increase in complication is due to factors such as the complexity in the communication requirements of IPTV services, as well as the variability between configurations at customer locations. It would be desirable to be able to identify a known install state for a customer to aid in the subsequent problem detection and repair. Thus, there is a need in the art to be able to utilize information gathered during the installation health check for problem diagnosis and repair.

SUMMARY

Embodiments include a method for providing an IP based device health check. The method includes initiating a health check to be performed at a customer location. The results of the health check are received and stored as an install state. A current state that was created in response to a diagnostic test executed at the customer location is received. The install state is compared to the current state to identify differences between the install state and the current state. Embodiments further include a computer program product for implementing the method.

Additional embodiments include a system for providing an IP based device health check. The system includes a storage device for storing a plurality of install states and a processor in communication with the database. The processor executes computer instructions for facilitating initiating a health check at a customer location. The results of the health check are received and stored as an install state in the storage device. A current state that was created in response to a diagnostic test executed at the customer location is received. The install state is compared to the current state to identify differences between the install state and the current state.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES.

The detailed description explains the preferred embodiments of the invention, together with advantages and features, by way of example with reference to the drawings.

DETAILED DESCRIPTION

Figure 1:
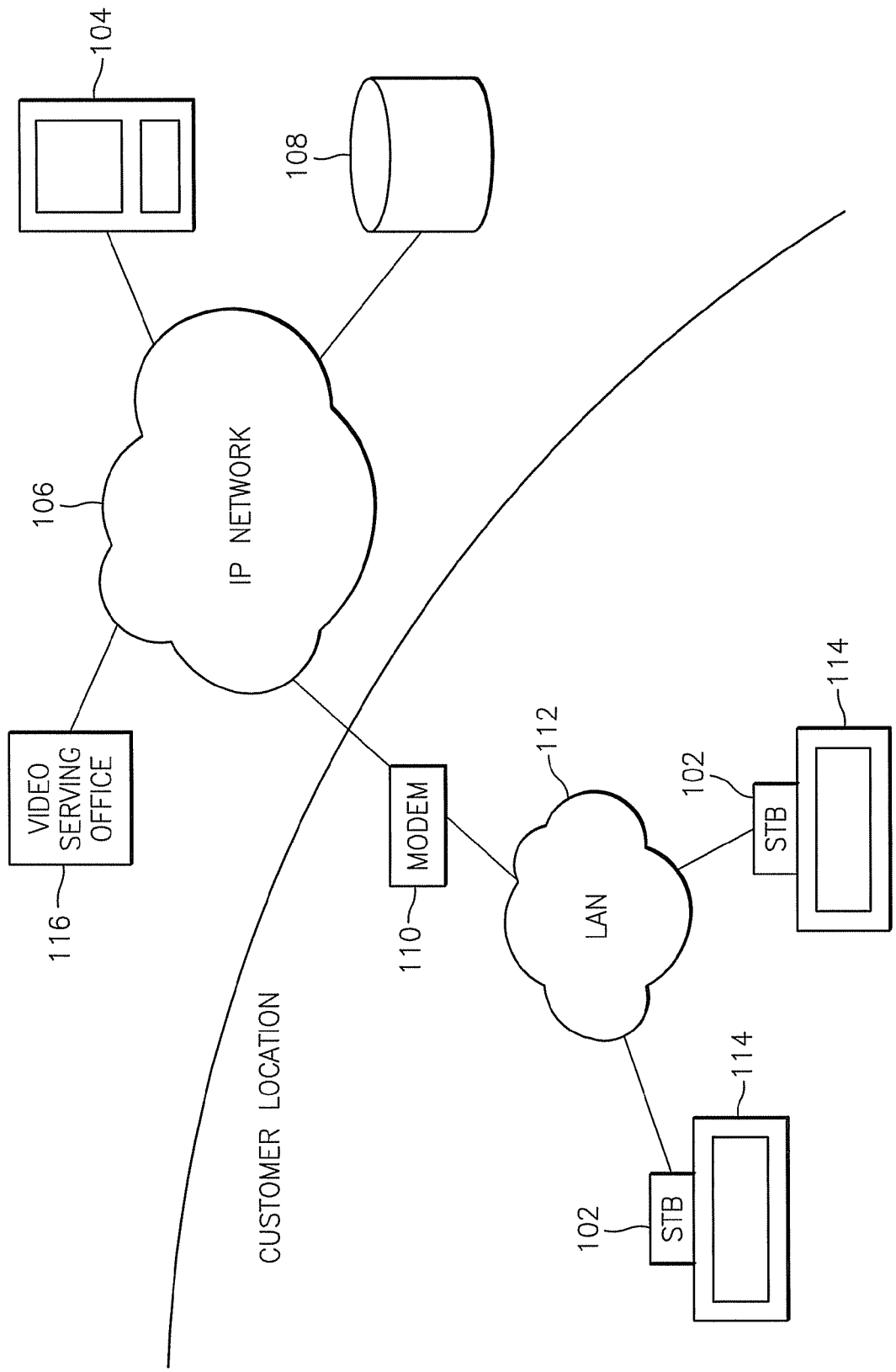
FIG. 1 depicts a system for providing an IP based device health check in exemplary embodiments.

FIG. 1 depicts a system for providing an IP based device (e.g., an IP television, or "IPTV") health check in exemplary embodiments. IPTV uses an addressable device, such as a set top box (STB) 102 associated with a client device 114 (e.g., a television) to provide services to a user/customer at a customer location. As known in the art, the STB 102 receives IPTV services such as broadcast video, broadcast audio, video on demand, etc. via an IP network 106 (e.g., an "IPTV network"). In alternate exemplary embodiments, the client devices 114 are coupled to STBs 102, wireless devices and/or computing devices to provide IPTV services. The STBs 102 are addressable by a device address such as a GUID, MAC address, SIM identifier, etc. As depicted in FIG. 1, in exemplary embodiments, the STBs 102 are coupled to a local area network (LAN) 112 at the customer location and then to a communication device 110, such as a DSL modem. The STB 102 may also include a digital video recorder (DVR) or be coupled to a DVR for storing information and content as described herein.

In exemplary embodiments, the IP network 106 communicates with various video serving offices (VSOs) 116 via Ethernet aggregation routers (EARs). At least one VSO 116 interfaces with a video head end office (VHO) through a broadband aggregation router (BAR). The VHO interfaces with the BAR through a head end router (IHR) which communicates with multiple systems for distributing content. One content system is a video on demand unit for providing content upon request by an IPTV client (e.g., a STB 102). Other content sources include a media distribution system which may deliver broadcast content on a national or regional basis. A media acquisition system receives content from an encoder that formats content from a content aggregator. It is understood that the IP network 106, the video serving office 116 and the communication device 110 may be interconnected using a variety of network technologies including wired and wireless technologies such as LAN, WAN, Internet, ATM, PSTN, Ethernet, 802.11, etc.

The system depicted in FIG. 1 is intended to be exemplary in nature as a variety of implementations are possible without departing from the scope of the invention. For example, in alternate exemplary embodiments, the customer location does not include a LAN 112 and the STB 102 is coupled directly to the IP network 106. In exemplary embodiments, the IPTV services are provided using a software platform such as the Microsoft TV IPTV Edition running on network elements in the network 106. As embodiments are directed at an IPTV health check, details of the IPTV services are not described herein. FIG. 1 is directed to IPTV, however the health check disclosed herein may be applied to other types of IP based devices including, but not limited to: communication devices, telephones, VOIP devices, data communication devices, IP appliances (washing machine, refrigerator, dishwasher, oven, etc.), MP3s, IP radios, IP set-top boxes, IP security systems, PCs, portable devices, vehicles, wireless devices, firewalls, modems, routers, and gateways.

In exemplary embodiments, a host system 104 executes an IPTV health check application to perform the functions described herein. The IPTV health check application may be implemented by software and/or hardware components. The STBs 102 include programming interfaces for communicating with the IPTV health check application. In addition, the STBs 102 may contain user interfaces for initiating the health check test. The user interfaces may be implemented by interface screens, audio technology, voice recognition technology, or any other technology to allow a user to communicate with the STB 102 to initiate the test. In exemplary embodiments, the processing described herein may be shared by the STB 102 and the host system 104 (e.g., by providing an applet to the STB 102) or contained completely within one or more of the STBs 102.

The IP network 106 may be any type of known network including, but not limited to, a wide area network (WAN), a local area network (LAN), a global network (e.g. Internet), a virtual private network (VPN), and an intranet. The IP network 106 may be implemented using a wireless network or any kind of physical network implementation. In alternate exemplary embodiments, the host system 104 and storage device 108 are in communication with the STBs 102 via a different network than the IP network 106.

A storage device 108 may be implemented using a variety of devices for storing electronic information. It is understood that the storage device 108 may be implemented using memory contained in the host system 104 or the STB 102 or it may be a separate physical device. The storage device 108 is logically addressable as a consolidated data source across a distributed environment that includes the IP network 106. Information stored in the storage device 108 may be retrieved and manipulated via the host system 104. The storage device 108 may include data such as the results of IPTV health checks (e.g., the install and current states). The storage device 108 may also include other kinds of data such as administrative information utilized by the IPTV health check application. In exemplary embodiments, the host system 104 operates as a database server and coordinates access to application data including data stored on storage device 108.

The host system 104 depicted in FIG. 1 may be implemented using one or more servers operating in response to a computer program stored in a storage medium accessible by the server. The host system 104 may operate as a network server (e.g., a web server) to communicate with the STB 102. The host system 104 handles sending and receiving information to and from the STB 102 and can perform associated tasks. In exemplary embodiments, the host system 104 also includes a firewall to prevent unauthorized access to the host system 104 and enforce any limitations on authorized access. For instance, an administrator may have access to the entire system and have authority to modify portions of the system. A firewall may be implemented using conventional hardware and/or software.

The host system 104 may also operate as an application server. The processor in the host system 104 executes one or more computer programs to implement the IPTV health check application. Processing may be shared by the STB 102 and the host system 104 by providing an application (e.g., java applet) to the STB 102. Alternatively, the STB 102 may include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

Figure 2:
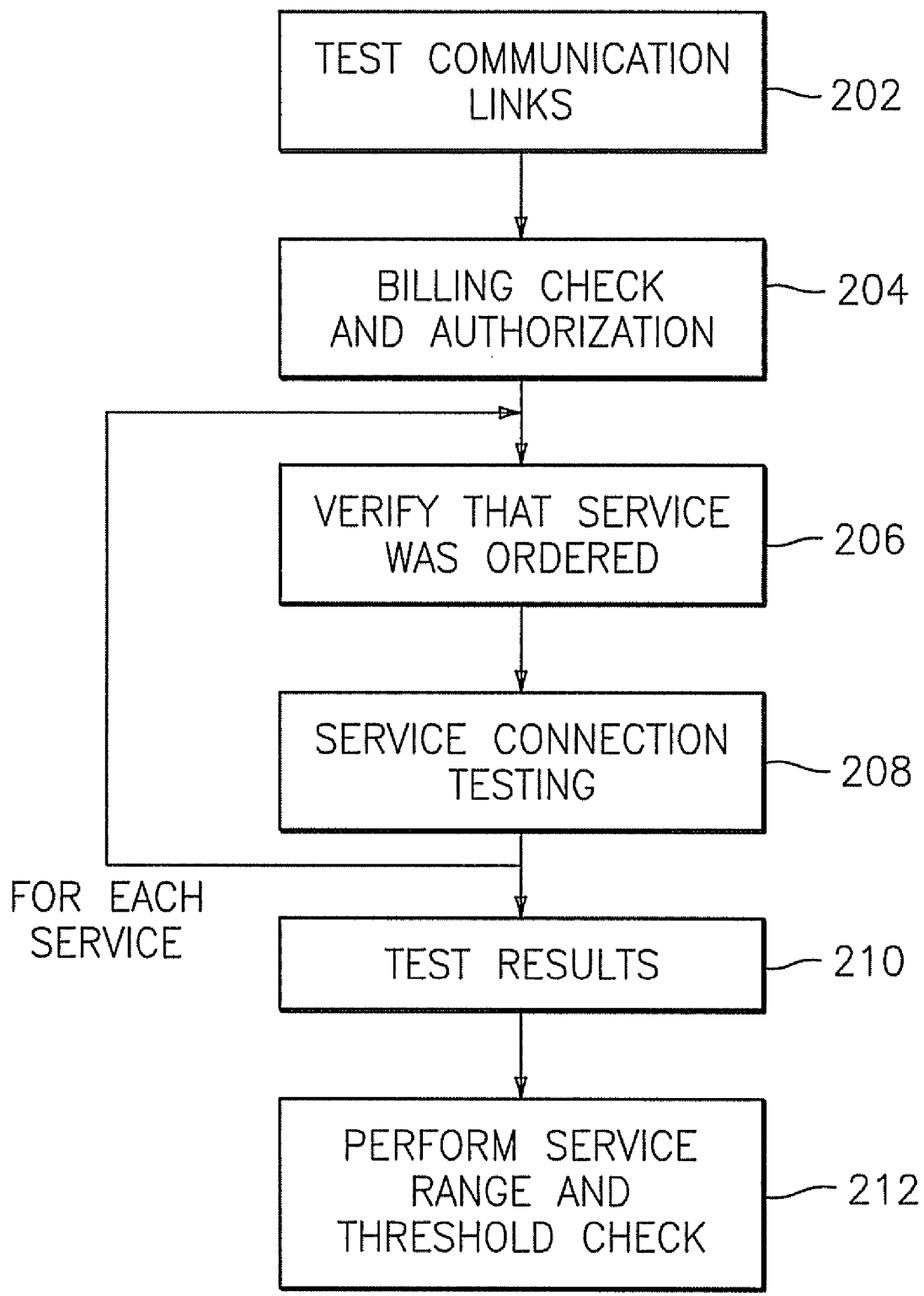
FIG. 2 depicts a method of performing an IPTV health check for an IPTV service in exemplary embodiments.

FIG. 2 depicts a method for performing an IPTV health check for an IPTV service in exemplary embodiments. At block 202, the host system 104 verifies the communication links. In exemplary embodiments, this includes host system 104 checking that there is a connection between the STB 102 and the IP network 106. In the exemplary system depicted in FIG. 1, verifying the communication links at block 202 could also include the host system 104 checking the connection between the STBs 102 and the LAN 112, between the LAN 112 and the communication device 110, and between the communication device 110 and the IP network 106. Output results from this block (also referred to as communication link data) may include, but are not limited to data such as: the number and IP addresses of the STBs 102 at the customer location, as well as version information about the LAN 112. In addition, the output results may also include color codes associated with the quality threshold levels of the communication links (e.g., red, yellow, green) to indicate characteristics of the links (e.g., available capacity and speed).

In exemplary embodiments, testing the communication links at block 202 includes DSL transport tests of the network, the pipe and the LAN. The network tests may include, but are not limited to: provisioning, authentication, and DNS latency. The pipe tests may include, but are not limited to: provisioning, port status, and DSLAM type. The LAN tests may include, but are not limited to: spyware/virus tests, traffic, CPE synchronization, CPE cables, wireless, CPE configuration, OS, and router.

At block 204 in FIG. 2, the host system 104 verifies billing records to check that the customer is in good standing with their current accounts with the service provider and/or that the credit card number that they have supplied for paying for the video services (e.g., a pay per view video service) is valid. Output results from this block (also referred to as billing record data) may include a quality threshold level from a highest rating (green), to a medium rating (yellow), and down to an unacceptable rating (red). The output results may be utilized for billing authentication before allowing a customer to access pay per view services such as, but not limited to, video games and movies.

At block 206 in FIG. 2, the host system 104 makes a verification to ensure that the service was ordered by the customer. As video content packages continue to get more specialized, this verification will increase in importance. For example, a user may order a video service that includes a music package with a particular sports package. At block 206, the host system 104 makes a check to verify that the customer did order the music package with the particular sports package. In exemplary embodiments, this check is made by accessing a customer order system. In other exemplary embodiments, this check is performed by the technician by looking at an order sheet and entering video service codes for services ordered by the customer into the STB 102 interface.

At block 208, the host system 104 tests the service connection for the video service that was ordered by the customer. In response, the STB 102 calls a content server at the video serving office 116 that provides the video service. In this manner, the host system 104 makes a verification that the STB 102 can connect to the content server and obtain the video service. In exemplary embodiments, where a customer location has more than one service from the IPTV service provider, the host system 104 performs a test to verify that two or more of the services can be active at the same time and still provide an acceptable quality of service. Other services include, but are not limited to: voice over internet protocol (VOIP) for providing phone service and broad band internet access for providing Internet access. In addition, the host system 104 may perform a test to determine if two or more of the STBs 102 at the customer location can be operating one or more of the service provider services (e.g., IPTV, VOIP and broad band internet access) simultaneously.

Output results from block 208 (also referred to as IPTV service data) may include a quality threshold level associated with each of the IPTV services running alone and with simultaneously with other services. Quality threshold levels may be expressed as "green" for highest quality, "yellow" for acceptable quality and "red" for unacceptable quality. Along with a general rating for each service, more specific data may be output for one or more services including ratings for video quality, and audio quality. Blocks 206 to 208 are performed for each IPTV service (e.g., games, video, picture services, etc.) ordered by the customer at the customer location. At block 210, the test results are output from the installation health check. In exemplary embodiments, the test results are stored as an install state or a current state. At block 212, a service range and threshold check is performed to determine if they are within predefined boundaries. In exemplary embodiments, the installation technician continues to tune the IPTV service(s) until all of the service ranges and thresholds are within the boundaries (i.e., until the services are in a working state). An IPTV is intended to be an example of an IP based device. The processing described in reference to FIG. 2 may be applied to other types of IP based devices (e.g., communication devices, telephones, VOIP devices, etc.).

Figure 3:
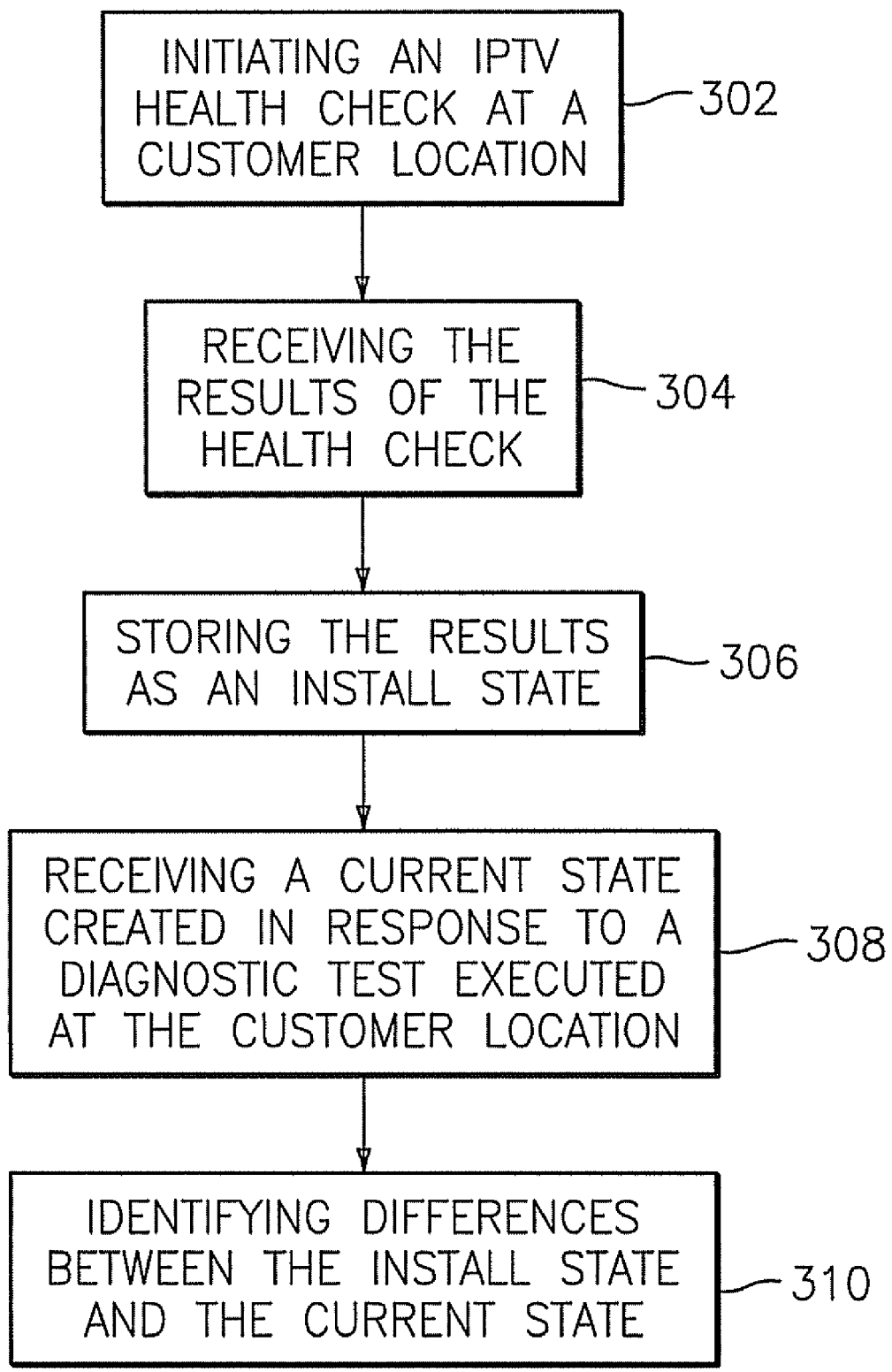
FIG. 3 depicts a method of providing an IPTV health check in exemplary embodiments.

FIG. 3 depicts a method for providing an IPTV health check in exemplary embodiments. At block 302, an IPTV health check (such as the one depicted in FIG. 2) is initiated by an IPTV service provider technician at a customer location. The service provider technician may initiate the EPTV health check after installing IPTV services at the customer location. The test may be executed as part of closing out the service call and verifying that the IPTV video service is working properly. The test may be triggered through an interface that appears on the client device 114 (e.g., a customer's television). Alternatively, the test may be triggered via a user interface on the STB 102. A service technician may initiate the test by pushing a button or a combination of buttons on a remote control device to cause a selection menu to be displayed on the client device 114. The service technician could then step through a menu to specify parameters of the test. Additionally, the health check may be triggered remotely from the STB 102 (e.g., by the host system 104).

In response to receiving the command to initiate the IPTV health check at block 302, the STB 102 executes the health check (if the computer instructions to execute the IPTV health check are located on the STB 102). Alternatively, if the computer instructions to execute the IPTV health check are located on a processor on the host system 104, the STB sends instructions (e.g., via an API) to the host system 104 to execute the test. The test would then be executed via APIs for communicating between the STB 102 and the host system 104. An exemplary IPTV health check is depicted in FIG. 2 and described previously in reference to FIG. 2.

At block 304 in FIG. 3, the results of the health check are received by the IPTV health check application. As described previously, the results of the health check include information about the state of the IPTV service and customer location when the IPTV service was successfully installed. At block 306, these results are stored (e.g., in the storage device 108) by the IPTV health check application as an install state. As used herein, the term "install state" refers to output from the health check performed when the service was installed. Further, the term "current state" refers to output from a health check performed after installation of the service. Exemplary embodiments compare the install state to the current state and make recommendations for correction. The term "working state" refers to the boundaries for the ranges and thresholds for measuring the DSL and IPTV services. In exemplary embodiments, the current state is compared to thresholds and ranges for various diagnostic measurements to determine if the service is satisfactory. For example, the DSL transport tests described previously may have working states that define satisfactory service. In addition, the IPTV service may have measurements such as, but not limited to: STB memory, audio statistics, video statistics, hardware, and signal noise ratios. Each of these measurements, or combinations of one or more of these measurements may have boundaries which define a working state.

At block 308, a current state is received by the IPTV health check application. The current state is created in response to one or more diagnostic tests being executed at the customer location. In exemplary embodiments, when a customer calls the IPTV service provider with an issue, a customer service representative will request that the customer executes particular diagnostic tests (or the customer service representative remotely executes the diagnostic tests at the customer location). The particular diagnostic tests to be executed by the host system 104 may be determined by looking at the data contained in the install state. For example, if the install state indicates that there was a yellow flag associated with the communication between the communication device 110 and the LAN 112, then the host system 104 may direct diagnostic tests to the link between the communication device 110 and the LAN 112. In exemplary embodiments, install states for customer locations within a particular geographic region may be compared to determine if there is an issue common to the geographic area. This may result in one or more diagnostic tests on network connections in the geographic area being executed by the host system 104. In some or all cases, the diagnostic test includes the host system 104 executing the entire health check, as depicted in FIG. 2, to compare all differences between the current state and an install state.

At block 310 in FIG. 3, the results of the diagnostic test(s), the current state, is compared by an IPTV health check application to the install state to identify any differences between the two. The identified differences may be utilized to pinpoint changes to the customer location and/or to the IPTV network since the health check was successfully executed. This information may be utilized by the host system 104 to provide suggested steps to fixing a customer reported issue with the IPTV service. The comparison may highlight changes such as a different LAN capacity, different LAN network traffic, different settings on the communication device, etc. In addition, this comparison may highlight connectivity issues such as an STB 102 that is no longer accessible by the IP network 106. In general, the comparison may be utilized by the host system 104 to pinpoint issues stemming from a problem with the customer location network (e.g., the LAN 112), a hardware issue, and/or a problem with the IP network 106. Further, the comparison analysis may include looking at the initial state or states prior to the time of testing based on date and/or changes. Changes can include hardware and/or software, services, users, network configurations, addressing, program versions, log files, testing results, etc. In addition, the state analysis may include multiple devices.

In exemplary embodiments, once the issue(s) is corrected, the IPTV health check test, as depicted in FIG. 2, may be re-executed by the host system 104 to create an install state to be stored in the storage device and used for future diagnostics.

An IPTV health check is intended to be an example of a computerized logic based device health check. The processing described in reference to FIG. 3 may be applied to other types of IP based devices (e.g., communication devices, telephones, VOIP devices, etc.).

The ability to capture an install state after the installation of an IPTV service for use in future diagnostics may lead to a decrease in the amount of elapsed time and manpower required to correct problems with the IPTV service. This may lead to increased customer satisfaction with the service and with lower costs for the IPTV service provider.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While exemplary embodiments have been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of providing an internet protocol (IP) based device health check, the method comprising:
  initiating a health check to be performed at a customer location;
  receiving the results of the health check;
  storing the results of the health check as an install state;
  receiving a current state created in response to a diagnostic test executed at the customer location;
  comparing the install state to the current state to identify differences between the install state and the current state; and
  initiating an automated service action at the customer location in response to the identified differences between the install state and the current state.

2. The method of claim 1, wherein the diagnostic test was executed in response to a detected issue at the customer location and the identified differences between the install state and the current state are utilized to resolve the detected issue.

3. The method of claim 1, wherein the IP based device is an IP television and the health check includes verifying communication between an IP network and one or more of a set top box (STB), a communication device, and a customer network at the customer location.

4. The method of claim 1, wherein the health check includes verifying a credit record of a customer at the customer location and testing access from the customer location to an IP based device service requested by the customer.

5. The method of claim 1, wherein the health check includes verifying that a customer at the customer location has ordered an IP based device service and testing access to the IP based device service from the customer location.

6. The method of claim 1, wherein the health check includes verifying a quality of service level for an IP based device service and an other service being run simultaneously with the IP based device service at the customer location.

7. The method of claim 6, wherein the IP based device service is an IPTV service and the other service includes one or both of voice over internet protocol and broad band internet access.

8. The method of claim 1, wherein the install state includes quality of service threshold levels for an IP based device service.

9. The method of claim 1, wherein the health check is initiated at the customer location.

10. The method of claim 1 wherein the current state includes communication link data and IP based device service data.

11. A system for providing an internet protocol (IP) based device health check, the system comprising:
  a storage device for storing a plurality of install states;
  a processor in communication with the database and including computer instructions for facilitating:
    initiating a health check at a customer location;
    receiving the results of the health check;
    storing the results of the health check as an install state in the database;
    receiving a current state created in response to a diagnostic test executed at the customer location;
    comparing the install state to the current state to identify differences between the install state and the current state; and
    initiating an automated service action at the customer location in response to the identified differences between the install state and the current state.

12. The system of claim 11, wherein the diagnostic test was executed in response to a detected issue at the customer location and the identified differences between the install state and the current state are utilized to resolve the detected issue.

13. The system of claim 11, wherein the IP based device is an IP television and the health check includes verifying communication between an IP network and one or more of a set top box (STB), a communication device, and a customer network at the customer location.

14. The system of claim 11, wherein the health check includes one or more of:

verifying a credit record of a customer at the customer location and testing access from the customer location to an IPTV service requested by the customer;

verifying that a customer at the customer location has ordered the IPTV service and testing access to the IPTV service from the customer location; and verifying a quality of service level for the IPTV service and an other service being run simultaneously with the IPTV service at the customer location.

15. The system of claim 11, wherein the health check is initiated at the customer location.

16. The system of claim 11, wherein the health check is initiated from a geographic location that is remote from the customer location.

17. A computer program product for providing an internet protocol (IP) based device health check, the computer program product comprising:

a storage medium readable by a processing circuit and storing instructions for execution by the processing circuit for facilitating a method comprising:

initiating a health check at a customer location; receiving the results of the health check;

storing the results of the health check as an install state;

receiving a current state created in response to a diagnostic test executed at the customer location;

comparing the install state to the current state to identify differences between the install state and the current state; and initiating an automated service action at the customer location in response to the identified differences between the install state and the current state.

18. The computer program product of claim 17, wherein the IP based device is an IP television and the IPTV health check includes verifying communication between an IP network and one or more of a set top box (STB), a modem, and a customer network at the customer location.

19. The computer program product of claim 17, wherein the IP based device is an IP television and the IPTV health check includes one or more of:

verifying a credit record of a customer at the customer location and testing access from the customer location to an IPTV service requested by the customer;

verifying that a customer at the customer location has ordered the IPTV service and testing access to the IPTV service from the customer location; and verifying a quality of service level for the IPTV service and an other service being run simultaneously with the IPTV service at the customer location.

20. The method of claim 1 wherein the service action includes problem diagnostics.

21. The method of claim 1 wherein the service action includes repair.

* * * * *